Dec. 30, 1958     C. E. COLWELL     2,866,684
SULFURIC ACID CLARIFICATION
Filed Aug. 3, 1956
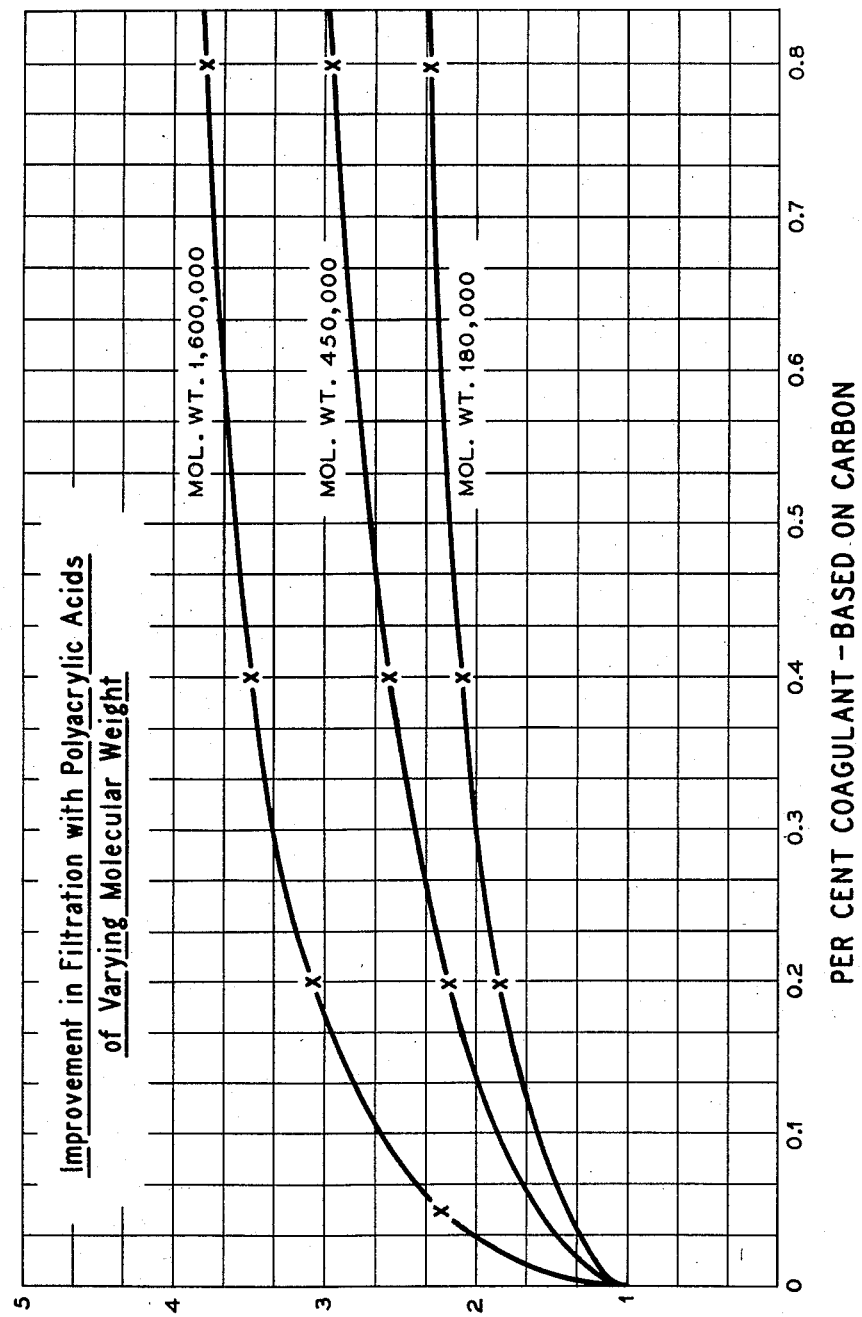
INVENTOR.
CHARLES E. COLWELL
BY
ATTORNEY

2,866,684

SULFURIC ACID CLARIFICATION

Charles E. Colwell, Pittsburgh, Pa., assignor to Union Carbide Corporation, a corporation of New York Application August 3, 1956, Serial No. 601,881

9 Claims. (Cl. 23—172)

This invention relates to a coagulation process for the removal of carbonaceous solids from contaminated sulfuric acid solutions.

In the preparation of alcohols, ethers and the like by the sulfuric acid catalyzed hydration of olefin hydrocarbons, large quantities of sulfuric acid are contaminated with carbonaceous residues. During the alkene absorption step, side reactions cause the formation of a mixture of higher molecular weight alcohols, tars, polymers and sulfur-containing compounds which are not removed from the acid by steam stripping under normal alcohol-generation conditions. Subsequent concentration of the contaminated acid at elevated temperatures degrades the contaminants to suspended carbonaceous particles. The carbon content of the recovered acid must be kept low to prevent the plugging of equipment and fouling of heat transfer systems. However, the many methods which have been suggested to prevent the accumulation of carbon during the concentration of the contaminated acid have certain disadvantages. Some of these are discussed below.

Sedimentation of the finely divided carbon particles in weak sulfuric acid requires excessively long detention periods. Filtration and centrifugation of the carbon are time-consuming processes that require special equipment and place a heavy demand on operating personnel. The rather frequent cleaning that the apparatus requires necessitates intermittent operation or standby equipment. Pressure distillation requires equipment with high mechanical strength which is chemically resistant to weak sulfuric acid at high temperatures. The removal of carbon by this method is not considered to be very efficient. Oxidation of the carbon by the addition of nitric acid requires the use of alloys resistant to nitric and strong sulfuric acids at high temperatures. Removal of the excess nitric acid from the acid concentrate poses additional problems. Paraffinic oil extraction of the carbon is a recent innovation in which the extracting oil dissolves or coats the carbon particles, causing the impurities to float in the immiscible oil layer. Modifications of this process, e. g., the addition of wetting agents to the oil, are being made to improve the degree of extraction obtainable.

It is the object of this invention to provide an improved method for the purification of sulfuric acid contaminated with carbonaceous particles.

This object is accomplished by flocculating the carbonaceous particles and then removing the flocs.

The coagulation is brought about by adding water-soluble polyanionic reagents to the contaminated sulfuric acid solution; these reagents are generally high molecular weight water-soluble polymers having a plurality of carboxyl groups spaced at intervals on a linear carbon chain as well as compounds which hydrolyze in sulfuric acid to yield such polymers. The preferred coagulant is polyacrylic acid or the alkali metal or ammonium salts of polyacrylic acid, or polymers which hydrolyze in sulfuric acid to yield polyacrylic acid.

The most satisfactory range of molecular weight of polyacrylic acid is about 180,000 to 1,600,000. The addition should be in an amount between 0.05 and 4.0 weight percent based on insoluble carbon.

Similarly for sodium polyacrylate, the most satisfactory molecular weight range is about 180,000 to 1,600,000 with the addition being from 0.05 to 4.0 weight percent based on insoluble carbon. Increasing the molecular weight of the coagulant results in better flocculation. The use of a dilute aqueous solution (0.25 to 1.0 percent) of the coagulant aids in achieving complete coagulant distribution. In this regard, the unneutralized polyacid coagulants have the advantage since they are less viscous, and therefore, more easily pumped or gravity fed than the corresponding neutralized polymers.

EXAMPLE I

Three polyacrylic acids having molecular weights of approximately 180,000, 450,000 and 1,600,000 were added as 0.25 percent aqueous solutions to a spent sulfuric acid solution having an acid strength of 61 percent and a carbon content of 0.84 weight percent. Dosages of each polyacid were varied within the range of 0.05 to 0.8 weight percent based on carbon. The coagulants were added to the spent acid at 80° C. while stirring at a rapid rate. Following addition, the slurry was conditioned for 15 minutes by stirring at 75 to 100 R. P. M. while maintaining the temperature at 80° C. A "filtration improvement factor" was calculated for each coagulant treatment by dividing the filtration time for the untreated acid by the filtration time for the treated sample.

The single figure is a graph of Filtration Factor versus Percent Coagulant, for the three polyacrylic acids of varying molecular weight. As may be seen from the figure, the filtration rate of the spent acid was increased from two to four fold depending on the molecular weight of the coagulant.

EXAMPLE II

A polyacrylic acid and a sodium polyacrylate each having molecular weights of approximately 1,600,000 were compared using the procedure described in Example I. The close agreement in the "filtration improvement factors" for equivalent dosages of these reagents can be noted in Table I.

Table I

| Coagulant | Filtration Improvement Factors at Coagulant Dosages of (percent on carbon) | | | | |
|---|---|---|---|---|---|
| | 0.05 | 0.20 | 0.40 | 0.80 | 4.00 |
| Polyacrylic Acid | 2.31 | 3.14 | 3.50 | 3.88 | 4.35 |
| Sodium Polyacrylate | 1.97 | 3.26 | 3.75 | 3.67 | 3.79 |

EXAMPLE III

A spent sulfuric acid solution was treated with sodium polyacrylate using the procedure described in Example I, and then clairified by sedimentation. The time required for the flocculated carbon to settle to 50, 40 and 30 percent of its initial volume in a 100 ml. graduated cylinder is given in Table II. Temperature during sedimentation was maintained at 70 to 80° C. The size of the carbon floc decreased and the sedimentation rate increased with decreasing coagulant dosages. Excellent clarification of the supernatant liquor was observed over the dosage range 0.2 to 4.0 percent coagulant based on carbon. Under similar conditions, no sedimentation or clarification was evident in an untreated spent acid solution over a 24 hour period.

Table II

| Sodium Polyacrylate Dosage (mol. wt. 1,600,000) Percent on Carbon | Time, in seconds, for Flocculated Carbon to Settle to a Percent of the Initial Volume Equal to— | | |
|---|---|---|---|
| | 50% | 40% | 30% |
| 4.0 | 30 | 53 | 110 |
| 0.4 | 17 | 33 | 116 |
| 0.2 | 15 | 27 | 71 |
| 0.1 | 10 | 17 | 44 |
| 0.05 | | | 41 |

Uniform distribution of the coagulant throughout the hot acid solution is best achieved by rapid mechanical mixing. Excessive vigorous agitation should be avoided since such treatment may reduce the floc size below the effective limits. In systems with a tendency to froth, continued agitation may hinder sedimentation by causing adherence of air bubbles to the floc. Treating temperatures in excess of 50° C. are required to achieve a degree of agglomeration which is consistent with rapid sedimentation or filtration. If the temperature of a 40 to 65 percent solution of sulfuric acid exceeds 85° C., convection currents may cause adverse stirring effects, reducing the sedimentation rate. Thus, it has been found that the preferred temperature for maximum sedimentation and filtration rates is between 50 and 85° C.

Adding the coagulant at a temperature at which it is insoluble, with subsequent heating to solubilize the flocculant, has been found to improve the filtration rate considerably. One such treatment, wherein the coagulant was added to cold spent acid at a dosage of 4.0 percent based on carbon followed by heating to 80° C., gave a six to eight fold improvement in the filtration rate. However, such coagulant dosages are quite high; at the more reasonable dosage of 0.8 percent coagulant there is little difference in performance whether the coagulant is added hot, or added cold and heated.

In usual industrial practice the spent acid is stored hot prior to reconcentration; it would be necessary to cool the acid and then reheat it for carbon removal by the technique of adding flocculant to cold acid. Since the cost of cooling and reheating are coupled with the cost of additional coagulant, this technique is generally economically less attractive than adding coagulant at lower dosages to hot spent acid.

It is to be noted that throughout this discussion, "coagulant" refers to those coagulants which do not degrade to dispersants upon hydrolysis.

The molecular weight values used throughout the discussions are approximations from intrinsic viscosity data employing the procedure described by P. J. Flory in Journal of Physical Chemistry, 58,653 (1954). The intrinsic viscosities were determined for polyacrylic acids which were one-third neutralized with sodium hydroxide in a solution which was 1.245 molar in sodium chloride. The molecular weights corresponding to the intrinsic viscosities so determined are shown in Table III.

Table III

| Intrinsic Viscosity | Viscosity—Average Molecular Weight |
|---|---|
| 0.342 at 32° C | 187,000 |
| 0.530 at 35° C | 450,000 |
| 1.02 at 36.1° C | 1,660,000 |

The advantages of this process over those used in the past for the removal of carbon from weak sulfuric acid are given below.

The advantages of the process of this invention over those used in the prior art are several. The process is simple; only the equipment ordinarily employed in sulfuric acid recovery units is used. High temperatures are not involved. The process is operable over a wide range of sulfuric acid strengths and coagulant demand is small. All of these factors contribute to low overall treating cost. Since the coagulant is removed with the sediment it does not contribute to further contamination of the acid. Flocculated carbonaceous sediment can be filtered at a much higher rate than untreated carbon; only a small fraction of the total acid supply then requires filtration and this operation can be carried out intermittently.

It is to be understood that the examples and advantages are given by way of illustration and not by way of limitation of the present invention.

What is claimed is:

1. A method for the flocculation of carbonaceous particles in a contaminated sulfuric acid solution which method comprises the step of bringing into intimate contact a high molecular weight water soluble polyacrylic acid with said carbonaceous particles in the sulfuric acid solution.

2. The method of claim 1 wherein the polyacrylic acid has a molecular weight of 180,000 to 1,600,000.

3. A method for the flocculation of carbonaceous particles in contaminated sulfuric acid which method comprises the step of dispersing a water soluble high molecular weight polyacrylic acid in the contaminated sulfuric acid solution.

4. A method for the removal of carbonaceous particles from a contaminated sulfuric acid solution which method comprises the steps of adding to said sulfuric acid solution a water soluble polyacrylic acid having a molecular weight of 180,000 to 1,600,000, agglomerating said carbonaceous particles by the action of the coagulating reagent and removing said agglomerated particles.

5. A method for the flocculation of carbonaceous particles in a contaminated sulfuric acid solution of 40 to 65 percent by weight of acid in the total solution which method comprises the steps of maintaining the temperature of said solution at 50 to 85 degrees centigrade and admixing with said contaminated sulfuric acid a water soluble polyacrylic acid in an amount of 0.05 to 4.0 percent by weight based on the carbonaceous particles, said polyacrylic acid having a molecular weight of 180,000 to 1,600,000 and separating from the sulfuric acid solution the flocculated carbonaceous particles produced by the action of the polyacrylic acid on the carbonaceous particles.

6. The method for the flocculation of carbonaceous particles in contaminated sulfuric acid solutions which method comprises the step of dispersing in said sulfuric acid a high molecular weight water soluble coagulating reagent selected from the group consisting of polyacrylic acid and salts of polyacrylic acid which are hydrolyzed to polyacrylic acid when added to said sulfuric acid solutions.

7. The method of claim 6 wherein the salt of polyacrylic acid is an alkali metal salt.

8. The method of claim 7 wherein the alkali metal salt is a sodium salt.

9. The method of claim 6 wherein the salt of polyacrylic acid is an ammonium salt.

References Cited in the file of this patent

UNITED STATES PATENTS

| 2,553,407 | Epps et al. | May 15, 1951 |
| 2,766,275 | Connelly et al. | Oct. 9, 1956 |